United States Patent

Macall

[15] 3,665,196

[45] May 23, 1972

[54] SOLID STATE SCANNING SYSTEM

[72] Inventor: Thomas F. Macall, Sunnyvale, Calif.

[73] Assignee: Midland Capital Corporation, New York, N.Y.

[22] Filed: Feb. 22, 1971

[21] Appl. No.: 117,454

[52] U.S. Cl. ........................250/83.3 H, 250/209, 250/211 J, 307/311

[51] Int. Cl. ..........................................................G01t 1/16

[58] Field of Search ..................250/71.5 S, 83.3 H, 83.3 HP, 250/209, 211 J; 307/311; 328/2

[56] References Cited

UNITED STATES PATENTS 3,317,733 5/1967 Horton et al. ........................250/211 J 3,400,273 9/1968 Horton ................................250/211 J 3,432,670 3/1969 Dym ....................................250/211 J 3,448,275 6/1969 Hall ....................................250/211 J

*Primary Examiner*—Donald D. Forrer

*Assistant Examiner*—R. C. Woodbridge

*Attorney*—Weingarten, Maxham & Schurgin

[57] ABSTRACT

A solid state infrared scanning system for generating a train of pulse-position modulated pulses with the position of each pulse representative of the radiation incident upon a corresponding detector cell in a linear detector array. Conversion of the pulse-position modulated signal to a corresponding amplitude modulated signal allows visual display of the amplitude modulated signal to produce an image of the incident radiation. The array of detector cells can also be rotated to provide a solid angle field of view.

11 Claims, 8 Drawing Figures

INVENTOR
THOMAS F. MACALL
BY
Weingarten, Maxham & Schurgin
ATTORNEYS

INVENTOR
THOMAS F. MACALL
BY
Wenderoth, Lind & Ponack
ATTORNEYS

INVENTOR
THOMAS F. MACALL
BY
Weingarten, Maxham & Schurgin
ATTORNEYS

INVENTOR
THOMAS F. MACALL
BY
Weingarten, Maxham & Schurgin
ATTORNEYS

SOLID STATE SCANNING SYSTEM

FIELD OF THE INVENTION

This invention relates to radiation sensors and in particular to a system for electrically scanning a field of view with an arrayed radiation detector.

BACKGROUND OF THE INVENTION

Infrared radiation has become a significant source of information about the body or object radiating it. Through the use of infrared detectors scanned along one or more orthogonal axes of a field of view, the infrared radiation received from that field of view can be converted to a sequence of electrical signals which, in turn, can be applied to a display, such as a cathode-ray-tube, to produce a pictorial representation of received radiation.

The scanning function can be achieved by the use of a single sensor which is mechanically scanned or which has an optical path mechanically scanned along the one or more axes. The mechanics for such a scanning system, however, are often expensive, delicate, and tend to be slow in scan rate. Instead, a dimensional array of detector cells may be used with mechanical or electrical systems for sequentially sampling or scanning the value of radiation incident on each cell of the array. Mechanical scanning systems for such an array tend to be electrically and mechanically noisy, of low reliability and sensitive to motion. Electronic scanning systems of conventional construction, produce deleterious switching transients, require often complicated and unstable reference voltage sources, and are generally limited in response due by the time constant of individual detectors and circuits over short sampling intervals.

BRIEF SUMMARY OF THE INVENTION

In accordance with a preferred embodiment of the invention, a scanning system is provided to repetitively generate a train of pulses which are position modulated to correspond, in real time, to infrared or other radiation focused onto an array of detector cells. The position of each pulse is representative of the amount of radiation incident upon a corresponding cell in the array.

Electronic scanning of the array of cells to produce the train of pulses is accomplished by applying a ramp signal to a series connected system of networks and pulse generators, each detector cell being a component of a corresponding network. The resistance of each detector cell is varied in response to the magnitude of radiation incident upon it, and each cell cooperates in each network to vary the potential or charge on a network capacitor in accordance with the cell resistance. Each network capacitor is charged during a rising portion of the ramp applied to that network above a reference level, preferably zero. Each capacitor is selectively discharged in accordance with the associated call resistance during a portion of the applied ramp below the reference level. Subtraction of the capacitor potential from the applied ramp level produces a signal which crosses the reference level at a time representative of cell resistance, and corresponding incident radiation. The ramp signal applied to each network is cumulatively offset by an average signal level contributed by each network in the series so that a separate, unique range of time is established for the level crossing by each network.

The use of a ramp signal and cumulative offsets provides electronic scanning without the problems of switching transients and reference voltage variation. Since the ramp is at a far slower frequency than the sampling frequency of the detectors, detector time constants are far less of a limitation on detector sampling rate.

The pulse train can be converted to a variable amplitude signal for use in controlling display intensity on a display screen to provide a pattern of light intensity positionally indicating radiation intensity received by the detector array. The array can also be mechanically rotated to provide a solid angle field of view for detected radiation which, in turn, can be displayed as a two dimensional light pattern on the display screen.

BRIEF DESCRIPTION OF THE DRAWINGS

These and other features of the invention will be more fully understood by referring to the following detailed description presented solely for purposes of illustration and to the accompanying drawings of which.

DETAILED DESCRIPTION OF THE INVENTION

Figures 1, 2:
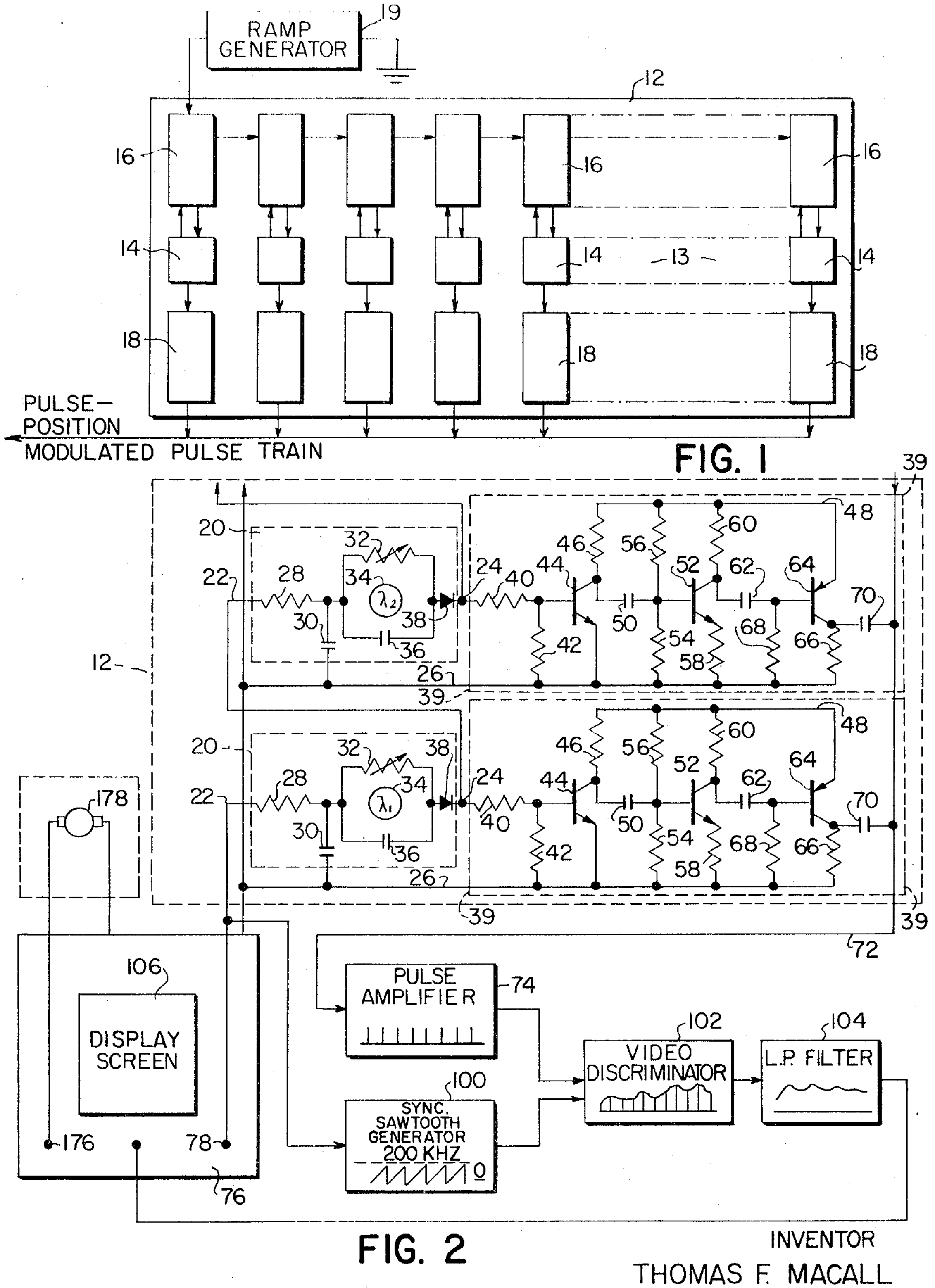
FIG. 1 is a block diagram useful in describing the general functioning of the invention.
FIG. 2 is a partial block and partial schematic diagram of the scanning electronics of the invention.

Referring to FIG. 1 a substrate 12 is shown supporting a linear array 13 of detector cells 14 and has thereon corresponding serially connected networks 16 and pulse generators 18. A ramp generator 19 applies a periodic ramp signal to the series connection of networks 16. One network 16 and pulse generator 18 is operative with each detector cell 14 to provide sequential scanning of each detector cell and to produce a pulse-position modulated pulse train in response to the ramp signal. The position of each pulse represents the radiation incident on a corresponding detector cell.

In the preferred embodiment each detector cell 14 is sensitive to infrared radiation from a source linearly displaced from the source of radiation for all other cells 14 in the array 13. While a preferred cell physical arrangement and cell spectrum sensitivity is used for purposes of illustration, it should be understood that the arrangement and spectral sensitivity can be adapted to the requirements of any particular use.

Referring now to FIG. 2, the electronics provided on the substrate 12 for performing the electronic scan of the array 13 is shown in partial schematic and partial block diagram. A plurality of networks 20 are provided on the substrate 12 and have inputs 22, outputs 24 and circuit ground points 26.

Each network consists of a resistance 28 connecting the input 22 to the high side of a capacitor 30, the low side of the capacitor 30 being connected to the ground terminal 26. From the junction of resistor 28 and capacitor 30 in each network a parallel combination of a variable resistor 32, a detector cell 34, and an offset capacitor 36 lead to the anode of a diode 38. A cathode of the diode 38 is connected to the output 24 of each network 20. All networks 20 are serially connected by having the output 24 of one network feed directly into the input 22 of the next succeeding network on the substrate 12. Successive networks 20 contain successive detector cells 34 in he linear array of cells.

The output 24 from each network leads to pulse generators 39 each comprising a voltage divider pair of resistors 40 and 42 leading to the ground point 26. The junction between the resistors 40 and 42 leads to the base of a grounded-emitter NPN transistor 44. A resistor 46 connects the collector of the transistor 44 to a positive voltage supply line 48. From the collector of the transistor 44 an output capacitor 50 provides AC coupling to the base of a transistor 52 which is biased by voltage divider resistors 54 and 56 connected respectively to the positive supply line 48 and ground point 26. Emitter resistor 58 connects the emitter of the NPN transistor 52 to the ground terminal 26 while a collector resistor 60 connects the collector of the transistor 58 to the positive supply line 48. An output capacitor 62 provides AC coupling and differentiation of the signal on the collector of transistor 52 and applies it to the base of a PNP transistor 64 having its emitter connected to the positive supply line 48. The collector of the transistor 64 is connected through a resistor 66 to the ground line 26 while the base is connected through a resistor 68 to the ground line 26. The transistor 64 functions as a pulse forming transistor and provides an output through a capacitor 70 connected to the collector of the transistor 64. The output sides of the capacitors 70 are all tied together to a pulse train conductor 72 leading into a pulse amplifier 74.

A CRT display 76 has a horizontal time base terminal 78 which is adjusted for a sawtooth ramp signal with a sweep rate of approximately 2 kHz. The ramp signal from this terminal is fed to the input 22 of the first network 20 in the series connection of networks.

Representative, exemplary values for important elements in the network 20 and pulse generator 39 are tabulated as follows:

| ELEMENT | VALUE |
|---|---|
| Detector 34 | Between 30K and 40 Meg ohms |
| Capacitor 36 | Between 0.01 and 1.0 microfarad |
| Resistor 28 | 2K ohms |
| Capacitor 30 | 1.0 microfarad |
| Ramp signal | 2 KHz at 2–10K ohms output impedance |
| Resistors 40 and 42 | 100K ohms each |

In operation the 2 kHz periodic ramp signal from the terminal 78 is an AC signal which spans the zero signal level as established by the level of the ground line 26. This signal is applied to the first network 20 and is low-pass filtered by the combination of resistor 28 and capacitor 30. Conduction through the diode 38 does not occur until the ramp signal becomes positive by an amount which exceeds any residual voltage on the capacitor 36 in parallel with the detector cell 34. The residual voltage on the capacitor 36 is determined by the resistance of cell 34 which discharges the capacitor 36, during negative portions of the ramp, from the voltage to which it is charged during positive portions of the ramp. Thus, the voltage at the output 24 of the first network 20 will exceed zero at a time dependent upon the charge of the capacitor 36 and correspondingly upon the resistance of the detector cell 34. Thus, because the resistance of the cell is dependent upon the radiation incident upon it, the time, relative to the time of the zero crossing of the 2 kHz ramp signal, at which a positive voltage first appears at the output 24 of the first network represents the radiation incident upon the detector cell in that first network. As soon as the output 24 begins to swing positive, the transistors 44, 52 and 64 respectively provide amplification, differentiation and saturation shaping so as to produce a well-formed pulse of defined amplitude out of capacitor 70. The time of occurrence of the pulse is delayed from the time at which the voltage on the capacitor 30 first becomes positive by an amount dependent upon the radiation incident on the corresponding detector cell 34.

From the output 24 of the first network 20 a connection is made to the input 22 of the second network 20. The low-pass filter formed by the resistor 28 and capacitor 30 of the second network receives the ramp signal through the AC coupling of the capacitor 36 in the first network and is adjusted with a sufficiently low time constant to filter out all transient and short term charge, discharge response preserving only an average voltage offset from the capacitor of the first network. This offset is in a negative direction and is added to a further short term voltage offset provided by the capacitor 36 in the second network 20. The pulse ultimately produced at the output capacitor 70 of the second pulse generator 39 is delayed by a time corresponding to the average offset plus a time representative of the radiation incident upon the detector cell 34 in the second network. Several cycles of the ramp signal are necessary as a warm up before the circuitry is at quiescence.

Additional similar networks and corresponding circuitry are provided for as many detector cells 34 as it is desired to place in the array 13. While the basic structure of each network is the same, the values of the elements may in fact vary slightly so as to preserve the average offset of each network at substantially the same value. The adjustable resistors 34 are further provided as a means for adjusting this average offset.

Figure 3:
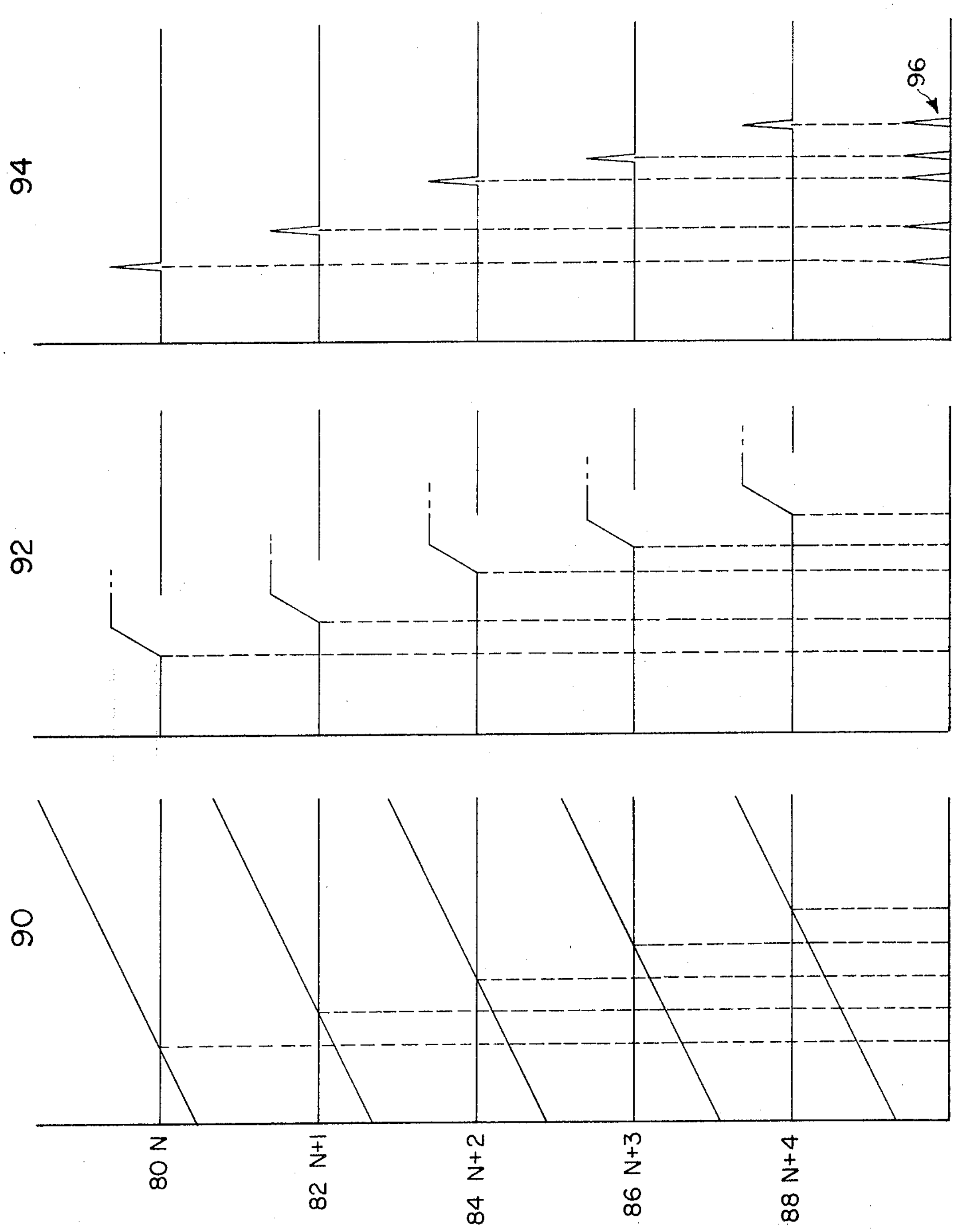
FIG. 3 is a waveform diagram useful in understanding the electronic scanning function of the invention.

A series of time sequence graphs 80, 82, 84, 86 and 88 corresponding to the networks and pulse generators of the Nth through N+4th detector cell are shown in FIG. 3 and represent the ramp waveform as observed at various points in a succession of five adjacent networks. The different circuit points at which represented waveforms are shown are indicated as 90, 92 and 94 corresponding to the signals at the inputs 22 after low-pass filtering, the signals at the outputs 24 after amplification, and the pulse shaped outputs at the capacitors 70. The result of summing all the outputs of the capacitors 70 into the line 72 produces a pulse train indicated as 96.

Returning to FIG. 2, the 2 kHz ramp from terminal 78 is fed to a synchronized sawtooth generator 100 operating at a frequency substantially higher than the 2 kHz frequency. The period of this high frequency sawtooth is calibrated to equal the period of the pulses in the train on line 72 when all detector cells receive equal radiation. The outputs of the pulse amplifier 74 and the synch sawtooth generator 100 are fed to a video discriminator 102 which amplitude modulates the sequence of pulses out of the pulse amplifier 104. As can be seen from FIG. 4, the modulating function is accomplished by adding the amplified pulse train to the output of the synch sawtooth generator 100 and adding enough negative bias so that the resultant signal exceeds the zero signal level only during the occurrence of a pulse from the amplifier 74. After positive half cycle rectification within the video discriminator 102, the resulting output pulses have an amplitude which depends upon their time of occurrence relative to each period of the sawtooth output. A low-pass filter 104 smooths out the amplitude modulated pulses and passes essentially their envelope to the Z axis of the display 76 for modulating the intensity of the trace on a display screen 106.

Figure 5:
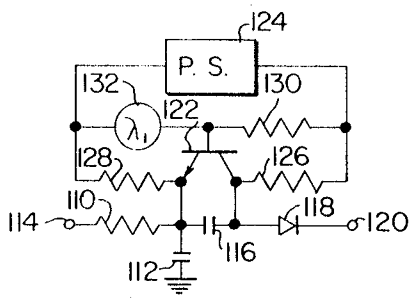
FIG. 5 is a circuit diagram of one form of modified detector cell network.

Several modifications may be made in the network 20 to provide increased sensitivity to variations in detector cell resistance, particularly at low levels of incident radiation and corresponding high values of detector cell resistance. One such modification is shown in FIG. 5 wherein a resistor 110 and capacitor 112 are connected as a low-pass filter across the input terminal 114 of the network. From the junction between the resistor 110 and the capacitor 112 an offset capacitor 116 leads to the anode of a diode 118 conducting in a forward direction to an output terminal 120 for the network. An NPN transistor 122 has its emitter and collector connected across the off-set capacitor 116 with the emitter connected on the low-pass filter side thereof. A power supply 124 for the transistor 122 is connected to the collector and emitter through resistances 126 and 128 respectively. The base of the transistor 122 is supplied with current by a voltage divider combination across the power supply 124 which consists of a resistor 130 and detector cell 132. According to this circuit configuration, the resistance variations of the detector cell 132 cause variations in the drive on the transistor 122 with resulting amplification of their effect on the capacitor 116 by the gain of the transistor 122 in the given configuration.

Figure 6:
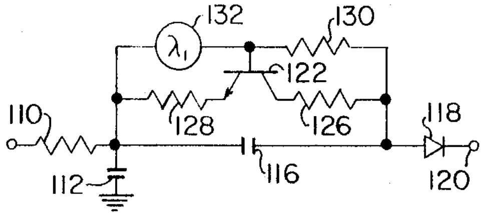
FIG. 6 is a circuit diagram of a further form of modified detector cell network.

FIG. 6 indicates a further modification similar to that of FIG. 5 but somewhat simplified by the elimination of the power supply 124 by connecting the capacitor 116 into the transistor circuit at terminals where the power supply 124 was connected in FIG. 5, and by eliminating connections between the capacitor 116 directly to the emitter and the collector of the transistor 122. In the FIG. 6 configuration the charge across the capacitor 116 provides the operating power for the transistorized circuit with operation in all other respects corresponding to that indicated for FIG. 5 to provide amplification of the effect of changes in the resistance of the cell 132 in discharging the capacitor 116. The transistor 122 provides a discharge path of reduced resistance for capacitor 116 under control of the higher resistance in the cell 132.

Figure 4:
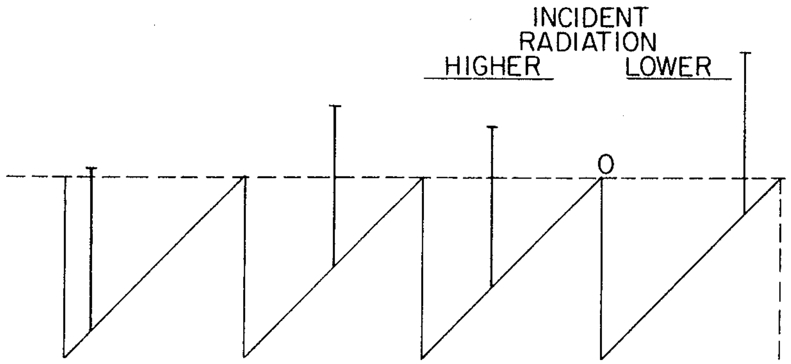
FIG. 4 is a waveform diagram useful in understanding the conversion of the pulse-position modulated signal to an amplitude modulated signal.
Figure 7:
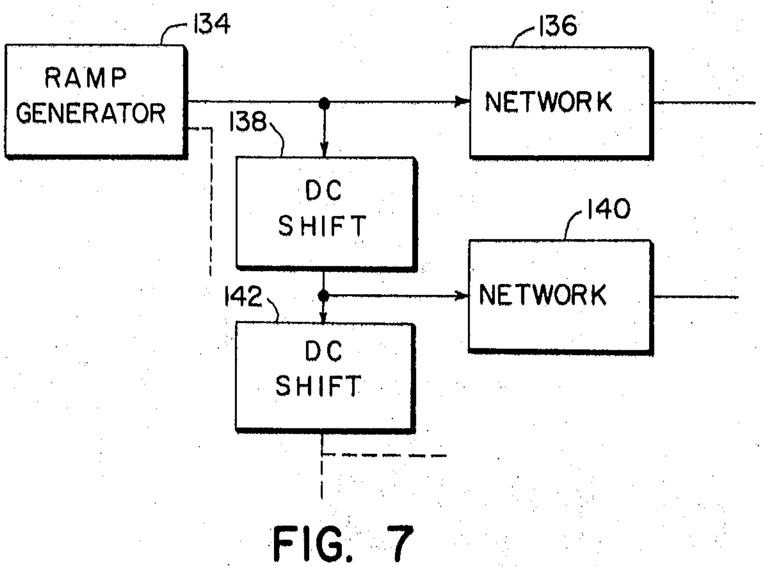
FIG. 7 is a block diagram of a modified scanning system.

As indicated above, the operation of the FIG. 2 system with the networks of FIGS. 1, 4, or 5 provides a cumulative reduction in potential of the ramp signal from one network 20 to the next. This cumulative reduction effectively provides a time shift from one network to the next in the point when the ramp signal crosses the zero level referenced to each network. This cumulative offset and resulting time shift produces the effect of an electronic scan of the values of the detector cells in the linear array. FIG. 7 shows a further alternative for achieving this electronic scan which comprises a ramp generator 134 applying a ramp signal to a first detector cell network 136 and also into a DC shift circuit 138 containing, for example, a filtered zener diode or battery. The shift circuit 138 subtracts a predetermined constant DC level from the ramp signal produced by the generator 134. The output of the DC shift circuit 138 is fed to a second detector cell network 140 and to a second DC shift circuit 142 providing a corresponding DC reduction in the signal from the ramp generator 134. This arrangement is repeated through as many DC shift circuits and networks as necessary to accommodate the number of detector cells in the linear array. The total system produces an electronic scan of the array of detector cells that results in a train of pulses which vary from a constant spacing by amounts representative of the radiation incident on each cell.

The DC shift circuit may comprise only a resistor such that the series of DC shift circuits across the ramp generator output comprises a voltage divider system. In this case, the ramp generator functions as a current source at its output terminals while the voltage amplitude corresponds to the ramp signal. It is important with these alternative systems that the voltage swing of each network due to detected radiation not exceed the DC shift between networks. In the FIG. 2 embodiment this is automatically provided by the capacitor offset operation.

Figure 8:
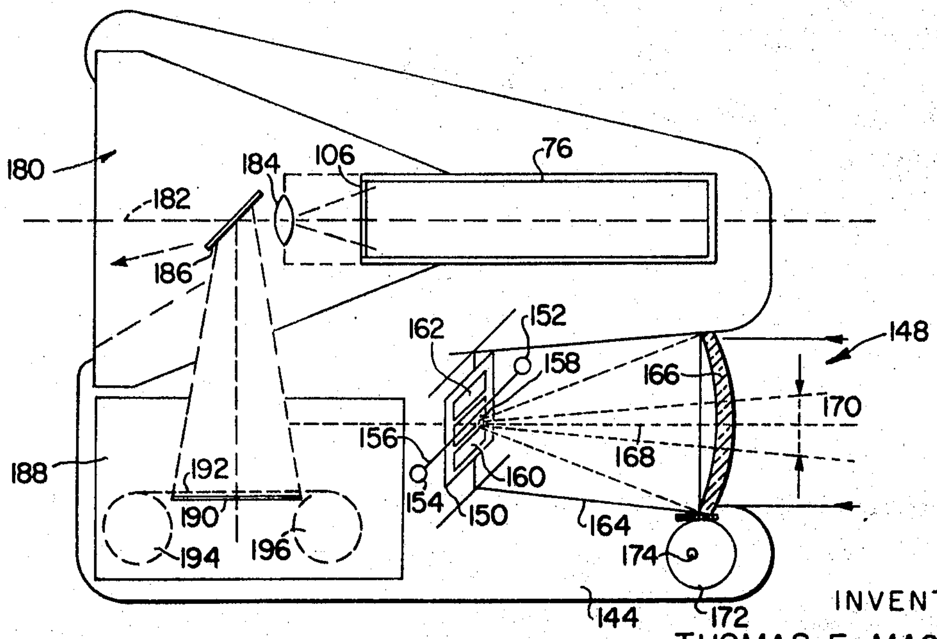
FIG. 8 is a diagrammatic view of a solid angle scanning system according to the invention.

Referring to FIG. 8, a diagrammatical representation is shown of a complete radiation sensing unit utilizing the scanning system of the present invention. The unit comprises a housing 144 having an aperture 148. Within the housing 144, and back from the aperture 148, a substrate 150 is supported by pivots 152 and 154 for rotation about an axis 156. Substrate 150 contains a linear array 158 of detector cells. On the same substrate, networks 160 and pulse generators 162 are placed adjacent to the cells of the detector array 158.

The substrate 150 is mounted by a support 164 to an infrared lens 166 in the aperture 148. An optical axis 168 of the lens 166 passes approximately through the center of the array 158 of detector cells. The lens 166 faces out of the aperture 148 toward a field of view 170. One edge of the lens 166 is forced against a cam 172 which revolves around an axis 174 parallel to the axis 156. Rotation of the cam 172 causes the lens 166 to move up and down about the axis 156 and varies the angle at which the optical axis 168 of the lens 166 points.

The support 164 is adapted for sliding motion of the substrate 150 relative to the lens 166 to adjust the focusing of radiation onto the array 158. Because the array 158 of detector cells is in fact a single line of cells, there will be focused onto the detector cells radiation received by the lens 166 over a one dimensional angle of the field of view 38. As the lens 168 is moved by the cam 172 and pivoted about the axis 156, that angle is swept over an orthogonal angle of the field of view 38 to cause scanning of a rectangular solid angle.

A vertical time base terminal 176 is provided on the display 76 and adjusted to have a low frequency (e.g. 20 Hz) sawtooth waveform which in addition to controlling the vertical sweep of the beam on the display screen 106 is also fed to a motor 178 synchronously operating at 20 Hz to drive the cam 172 of FIG. 7 which in turn oscillates the lens 166 about the axis 156 at a 20 Hz rate.

In diagrammatic form in FIG. 8, the display 76 fits within the housing 144 and its display screen 106 faces into a chamber 180 perpendicular to the optical axis 182 of a converging lens 184. A reflecting surface 186 is positioned at a 45 degree angle to the optical axis 182 beyond the lens 184 and reflects illumination from the display screen 106 toward a camera 188 comprising a film plane 190 supporting film 192 stretched between film takeup and supply reels 194 and 196, respectively. The lens 184 is adjusted to focus the image from the display screen 106 onto the film 192. To provide camera shutter action a conventional mechanical shutter, not shown, may be provided in the camera 188 or the display 76 may be adapted in conventional manner to provide display for a predetermined time interval so as to expose the film 192 by a predetermined exposure.

While the above preferred embodiment has been described with reference to specific frequencies and periods for ramp and sawtooth signals, it is obvious to one skilled in the art that substantially different frequencies and periods can be used to accomplish the same functioning of the invention. It should be similarly clear that various circuit and mechanical alterations and modifications can be used with this invention. In particular the array need not be a straight line of detector cells but may be any predetermined pattern of cells. Also the detector cells may be sensitive to a radiation other than infrared such as visible or may represent any variable conductance device. Further modifications and alterations will occur to those skilled in the art and it is accordingly intended to limit the scope of this invention only as indicated in the following claims.

What is claimed is:

1. A system for sequentially scanning a plurality of radiation sensors to provide a sequence of signals representing radiation incident on corresponding sensors, said system comprising:
   - a plurality of series connected networks, each including:
     - one of said plurality of radiation sensors;
     - means for averaging the signal input to each said network; and
     - a signal accumulating element connected to receive the output of said signal averaging means;
   - means for applying a periodic electrical signal having a portion of steadily rising signal level to said series connection of networks;
   - each of said signal accumulating elements providing an output signal for said network having an offset from the level of the output signal of said associated signal averaging means by an amount representative of the signal accumulated by said signal accumulating element;
   - each of said signal averaging means receiving the output of the preceeding network in said series connection and being operative to reduce variations in said offset from the preceding network;
   - said signal accumulating element being operative in response to said applied periodic electrical signal to provide an increase in the signal accumulated by each of said signal accumulating elements whenever the output of the associated signal averaging means is above a reference level and to provide a decrease in the signal accumulated by each said signal accumulating element at a rate representative of the radiation incident on each said associated sensor whenever the output of the associated signal averaging means is below said reference level; and
   - means operative in response to the output signal of each network for producing a signal at a time corresponding to the time when said output signal crosses a predetermined signal level in response to the rising portion of said periodic electrical signal.

2. The scanning system of claim 1 wherein said reference level and said predetermined signal level for said network output are circuit ground for said signal producing means.

3. The scanning system of claim 1 wherein:
   said signal averaging means comprises a low-pass filter;

said signal accumulating element comprises:

a capacitor having said associated sensor connected in parallel with said capacitor;

a diode;

a resistance;

said capacitor receiving the output of the associated low-pass filter at one terminal thereof and conducting the signal on the other terminal to one terminal of said diode;

the other terminal of said diode providing the output of said network and being connected to said reference level through said resistance;

said signal producing means is a plurality of pulse generators associated with a corresponding network to provide a pulse output whenever said output of said network crosses said predetermined signal level; and means are provided for summing the outputs of each of said plurality of pulse generators to produce said sequence of signals representing the radiation incident on corresponding sensors.

4. The scanning system of claim 3 wherein a plurality of means are provided for amplifying the response of each said sensor to received incident radiation to provide a greater change in the rate of decrease of said signal accumulated by said capacitor with change in the incident radiation on the associated sensor.

5. The scanning system of claim 4 wherein said means for increasing the response of each said sensor includes a solid state amplification device having a control terminal thereof controlled by variation of said associated sensor in response to incident radiation thereon and having controlled conduction terminals thereof connected in a path to cause said decrease in the signal accumulated by said associated capacitor.

6. The scanning system of claim 1 further comprising:

a substrate supporting a linear array of said sensors;

means for directing radiation from an angle of view onto said linear array of sensors;

means for scanning said directing means to cause said angle of view to sweep repetitively across a solid angle of view for radiation incident upon said sensors and to provide a series of said sequence of signals wherein each said sequence of signals represents radiation incident upon said linear array of sensors from an angle of view which is displaced in the direction of sweep from the angle of view for the directly previous sequence of signals.

7. A system for sequentially scanning a plurality of radiation sensors to provide a sequence of signals representing the radiation incident on corresponding sensors, said system comprising:

means for generating a periodic electrical signal having a portion of steadily rising signal level;

a plurality of similar electrical networks each having a respective one of said sensors associated therewith;

each of said networks having:

input signal filtering means for filtering variations, from period to period of said periodic electrical signal, in signals input to said network; and means for accumulating signals from said filtering means whenever said signals from said filtering means exceed a reference level and for reducing the signal accumulated by said accumulating means at a rate determined by the radiation incident upon the sensor associated with said network during a portion of the signal from said filtering means below said reference level;

said signal accumulating means being connected between an output of said filtering means and an output of said network whereby the signal at the output of said network is offset from the signal at the output of said filtering means by the signal from said accumulating means;

means for serially connecting said networks;

means for applying said periodic electrical signal to said series connection of networks; and means responsive to the output of each of said networks for producing one of the signals of said sequence of signals whenever the output of a corresponding network crosses a predetermined level in response to the rising portion of said periodic electrical signal.

8. The scanning system of claim 7 further comprising:

means for combining the signals of said sequence of signals into a pulse train where each pulse is pulse-position modulated in accordance with the radiation incident upon its corresponding sensor;

means for converting said pulse train of pulse-position modulated pulses into an amplitude modulated signal; and a display responsive to said amplitude modulated signal to provide a light pattern which is intensity modulated at points which indicate the position and magnitude of radiation incident upon said sensors.

9. The scanning system of claim 8 wherein said converting means comprises:

means for generating a sawtooth signal with each rising portion thereof coextensive in position with the range of expected positions for a corresponding pulse in said pulse train;

means for summing said sawtooth signal and said pulse train to provide a sum signal;

means for clipping said sum signal at a clipping level which eliminates all portions of said sum signal except portions attributable to said pulse train; and means for smoothing said clipped signal to produce said amplitude modulated signal.

10. A system for sequentially scanning a plurality of radiation sensors to provide a sequence of signals representing the radiation incident on corresponding sensors, said system comprising:

means for generating a periodic electrical signal output having a portion of steadily rising signal level;

a plurality of signal shift networks series connected to receive the output of said generating means and to provide a signal at the output of each said network which is of a signal level cumulatively less than the output of said generating means as determined by the position of each said shift network in the series connection thereof;

means associated with each of said networks and each of said sensors for accumulating a signal at a first rate whenever the output of the associated network is above a predetermined signal level and for reducing said accumulated signal at a rate representative of the radiation incident upon the associated sensor during other portions of the output of the associated network;

each of said accumulating means producing an output which is the output of the associated network offset by an amount representative of the signal accumulated on said signal accumulating means;

means associated with each of said signal accumulating means for producing a signal at a time corresponding to the time when the output of the associated signal accumulating means exceeds a predetermined signal level; and means for combining said produced signals to provide said sequence of signals representative of the radiation incident on corresponding sensors.

11. The scanning system of claim 10 wherein:

said plurality of series connected networks includes a resistive voltage divider with the junction between each adjacent pair of resistive elements of said voltage divider providing the output of each network; and said generating means provides a substantially uniform current to said series connection of networks and a variation in the potential at the terminal points of said series connection corresponding to said periodic electrical signal.

* * * * *